Jan. 27, 1970
T. M. WALTERS
3,491,889
LIQUID FILTER
Filed Nov. 27, 1967
2 Sheets-Sheet 2
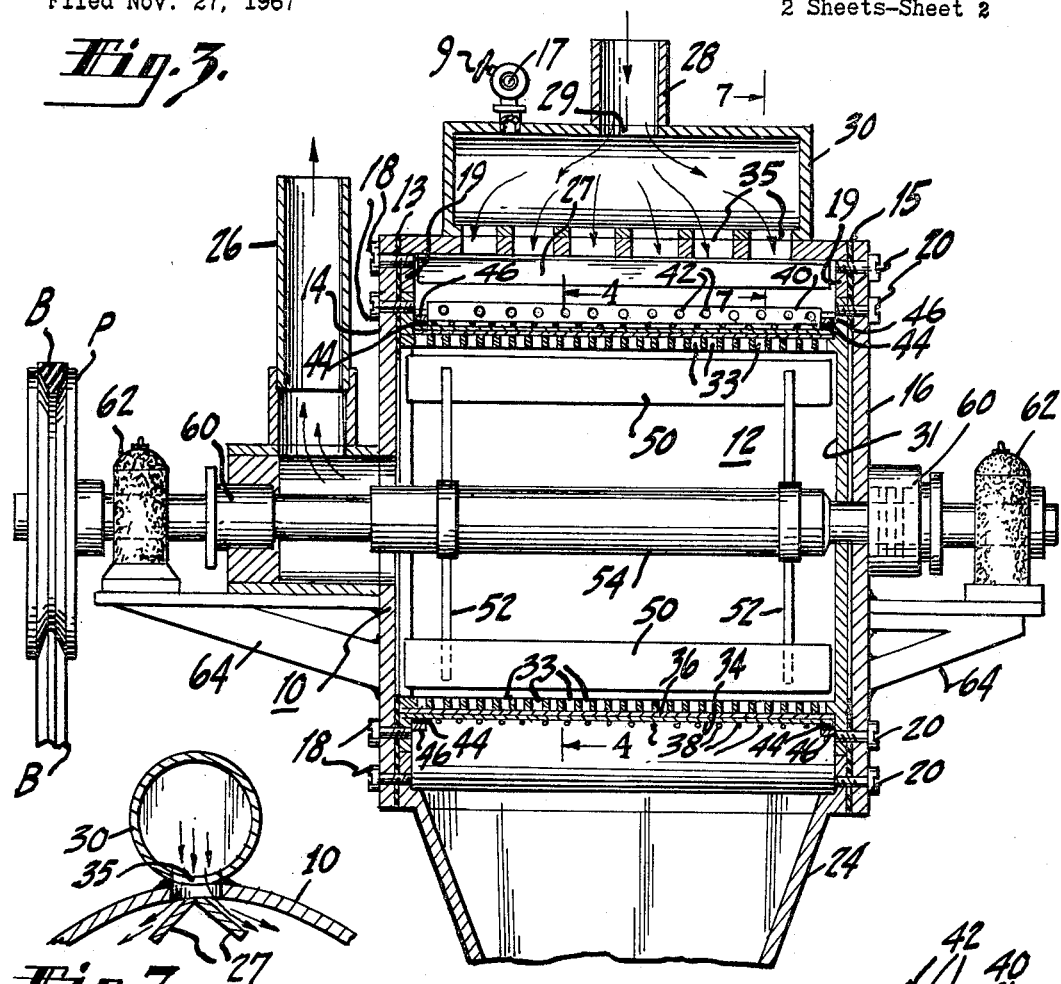
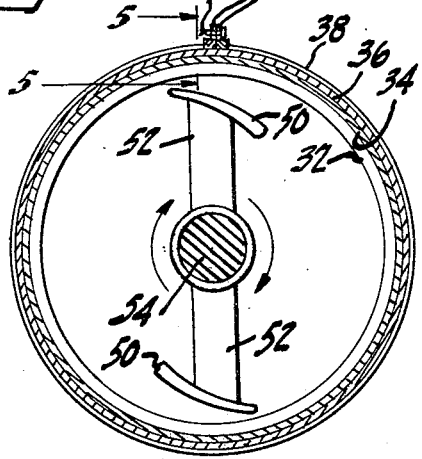
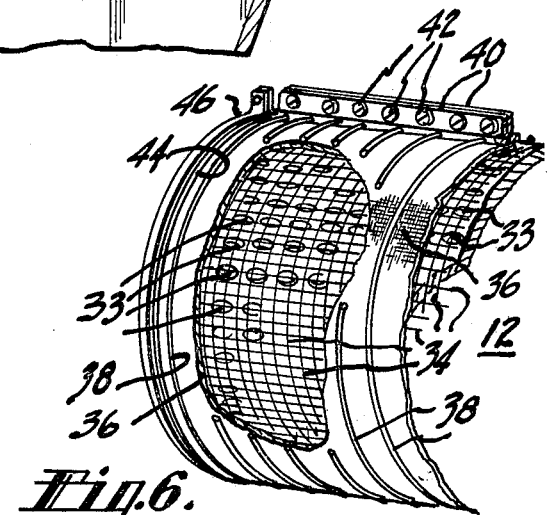
INVENTOR
THEODORE M. WALTERS
BY Charles H. Brown
ATTORNEY United States Patent Office 3,491,889
Patented Jan. 27, 1970

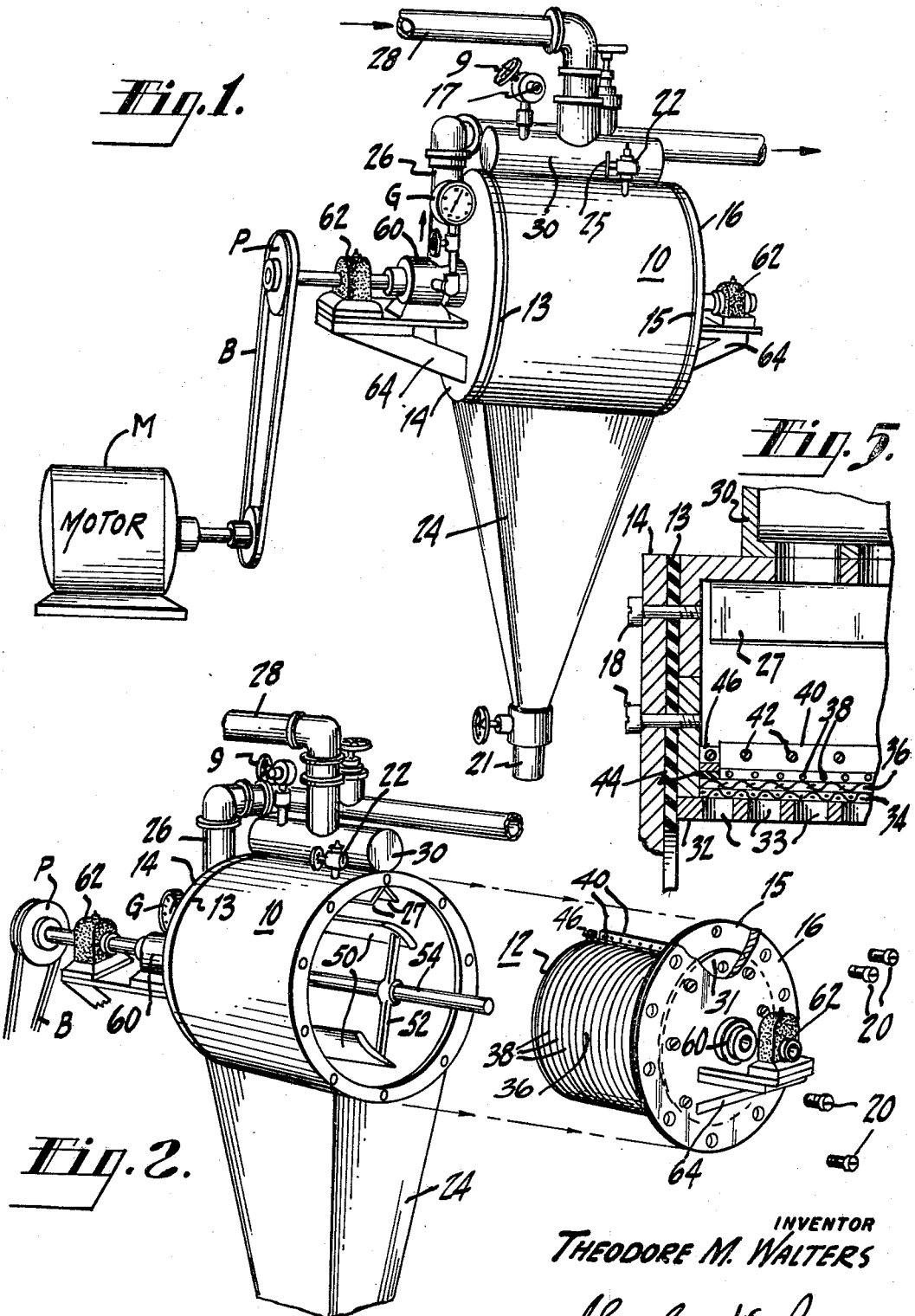

3,491,889
LIQUID FILTER
Theodore M. Walters, Milford, N.J., assignor of twenty-five percent to Charles H. Brown, Princeton, N.J.
Filed Nov. 27, 1967, Ser. No. 685,826
Int. Cl. B01d 29/38
U.S. Cl. 210—411                  14 Claims

ABSTRACT OF THE DISCLOSURE

A liquid filter is provided in the form of an outer housing and an inner chamber or cylinder. The inner chamber has a filter screen wound around it and held tightly in place thereon. Rotatable washer arms are positioned within the interior of the inner chamber for continually producing a back wash of liquid from the interior of the inner chamber out through the filter screen for dislodging solid particles tending to cling to the exterior of the filter screen.

---

This invention comprises a novel, highly efficient, easy-to-fabricate and relatively low cost self-cleaning filter for straining dirt and undesirable solid matter, such as fibers, from a flowing fluid such as a liquid or slurry. The filter of the invention is useful for many purposes, such as by way of example, for separating the pulp fibers from a liquid, or for delivering clean filtered liquids as water for drinking or to a swimming pool, or for recovering and re-using liquids from which solid particles have been removed.

An object of the invention is to provide a relatively simple and highly effective self-cleaning clear liquid filter which automatically operates to clean its filter screen while a continuously rotating back-washer element rotates within the interior of the filter screen.

In accordance with an embodiment of the invention, the filter of the invention comprises a stationary outer casing or housing containing therein a stationary chamber or cylinder provided with a filter screen, such as a filtering fabric or cloth, around the periphery thereof. Within the inner cylinder there are provided a plurality of back-washer arms symmetrically positioned around and affixed to a revolving shaft. The arms are so oriented and arranged that as they rotate with movement of the shaft, the arms scoop up and forcibly push the liquid from the interior of the inner cylinder outwardly and through the filter screen at the locations of the arms nearest the screen, thereby dislodging any solid matter tending to cling to the exterior of the filter screen.

A feature of the invention is the design of the back-washer arm which extends substantially over the entire effective length of the filtering screen, and by virtue of its skewed or slanted arrangement and close proximity to the screen causes a pulsating back flow of liquid against the filter screen at the location of that portion of the arm nearest the filter screen. By positioning two or more such screen washer arms, for example three or four, symmetrically around and affixed to the revolving shaft, the self-cleaning action on the screen is continuous and effective.

While the theory herein advanced of the pulsating flow of liquid produced by the rotating washer arms is believed to be accurate, it should be understood that the invention is not limited by the correctness of any theory given to explain the highly desirable results achieved by the novel construction of the filter.

Other objects and features will appear from a reading of the following description given in conjunction with the accompanying drawing, wherein:

FIGURE 1 is a perspective view of an embodiment of the invention actually constructed and successfully tested;

FIGURE 2 is a partly exploded perspective view of certain parts of FIGURE 1 with the end of the metallic disc which is attached to and supports the inner stationary cylinder partly in section to illustrate more clearly the correlation of the cooperating elements;

FIGURE 3 is a vertical section through the filter of FIGURE 1;

FIGURE 4 is a sectional view along the line 4—4 of FIGURE 3 and shows the inner stationary cylinder around which there is wrapped the filter screen and the interiorly positioned revolvable shaft with the two back-washer arms oriented and arranged in novel fashion and affixed to the shaft;

FIGURE 5 is a sectional view of an end portion of the outer stationary cylinder against which the end of the inner stationary cylinder rests;

FIGURE 6 is a perspective view, partly in section, of the inner stationary cylinder rests;

FIGURE 6 is a perspective view, partly in section, of the inner stationary cylinder, showing the filter screen, the supporting larger mesh back wire screen, and the overlaying clamping wires for holding the filter screen firmly against the inner cylinder; and FIGURE 7 is a sectional view taken along the line 7—7 of FIGURE 1 and shows the details of the inlet pipe and the angularly positioned liquid deflector plates.

Throughout the figures of the drawing the same parts are represented by the same reference numerals.

The liquid filter of the invention comprises an outer stationary metal housing or casing 10 containing therein an inner stationary metal foraminous chamber or cylinder 12 having a multiplicity of holes 33. The inner cylinder 12 is preferably concentrically arranged relative to the outer casing and supports a liquid filtration cloth or screen 36 for filtering debris or solid particles from the incoming liquid, as will be described in more detail hereinafter. Within the stationary inner cylinder and along its longitudinal axis there is a rotatable shaft 54 which is driven from a motor M via suitable means such as a belt B and a pulley P, as shown. Attached to the revolving shaft 54 by means of rods 52 and driven thereby are two back-washer arms 50 which extend substantially over the entire effective length of the inner cylinder 12 and its filter screen 36. The filter screen may be a cloth or fabric of suitable mesh and density.

The outer housing 10 comprises an outer cylindrical metal wall whose ends are closed by metal end cover plates or discs 14 and 16 through bolts 18 and 20 respectively. The bottom of the outer housing communicates over its entire length with a funnel 24 to enable the sediment, fibers or solid particles filtered from the incoming liquid to be washed out through pipe 21 to a sewer or other disposal unit. The upper part of the outer housing is provided with an air vent 22 which, by means of a manually operated valve 25 permits a reduction in air pressure in the interior of the outer housing shortly after the start of operation of the liquid filter of the invention.

A clean liquid discharge pipe 26 carries away the clean or filtered liquid, such as water, in the direction of the arrows shown in or alongside of this pipe. The inlet comprises an elongated metal cylinder or liquid distribution arrangement 30 which is attached to the stationary outer housing and closed except for the opening 29 at its top to the inlet feed pipe 28 and the six spaced openings 35 at its bottom for distributing the incoming liquid substantially uniformly over the length of cylinder 30 to the interior of the outer housing. The liquid distribution cylinder 30 is provided with end flanges 19 to enable its attachment to the outer stationary housing 10. The arrows in pipe 28 and the interior of the metal cylinder 30, as shown in FIGURES 3 and 7, indicates the direction of the incoming liquid which is to be filtered. The pipe 28 introduces the incoming liquid under pressure to the inlet distribution cylinder or box 30. Positioned below and attached to the upper part of the outer housing 10 are a pair of metal liquid deflecting plates 27 (note FIGURES 2 and 7) for deflecting the liquid entering the outer housing from opening 35 into opposite directions on both sides of the inner cylinder 12. The deflecting plates 27 are angularly disposed at an angle to one another for example, 90 degress, so that the incoming deflected liquid strikes the interior wall of the outer housing and does not directly strike the filter screen.

The stationary inner chamber or cylinder 12 comprises a metal cylinder 32 having numerous uniformly spaced holes 33 over the entire length thereof, as shown in FIGURES 3 and 6. A very fine filter screen 36 such as a filtration cloth is mounted upon the exterior of inner cylinder 32 for filtering out the solid particles in the incoming liquid. The fine filter screen 36 is supported by a thicker and very coarse back wire screen 34 whose apertures are considerably larger than the very fine and extremely small openings in the filter screen 36. To hold the filter screen tightly against the coarse screen 34 and the inner cylinder there are provided a plurality of circularly arranged parallel wires 38 positioned over the filter screen and held firmly and rigidly in place by a pair of clamping bars 40 to which the ends of the wires 38 are attached. A multiplicity of holes 42 in the clamping bars 40 accommodate screws or bolts 43 for tightening the bars 40 against each other. Note FIGURES 3, 4, 5 and 6.

The inner cylinder 12 is provided at one end with a metal end plate 31 which is held to the end cover plate 16 of the outer cylinder by means of bolts 20. A rubber sealing gasket 15 is positioned between end cover plates 16 and one flange 19 of the liquid distribution arrangement 30. The other end of the inner cylinder fits tightly against another rubber sealing gasket 13 which is positioned between end cover plate 14 and the other downwardly turned metal flange 19 of the liquid distribution cylinder 30. The bolts 18 tightly fasten the flanges 19 to the end plate 14. Note FIGURE 3. Rubber sealing rings 44 held tightly in place by clamping rings 46 at both ends of the inner cylinder, positioned over the very fine filter screen 36 prevent unfiltered liquid from entering the inner cylinder through the ends of the cylinder, thus assuring that only liquid which passes through the filter screen 36 enters the interior of the inner cylinder.

The axially centrally positioned revolving shaft 54 is provided with a pair of spaced metal rods 52 which support the back-washer arms 50. These arms 50 are in the form of rigid metal plates and extend over substantially the entire effective length of the inner cylinder and have appreciable area as indicated in FIGURES 2, 3 and 4. An important aspect of the invention is the skewed or slanted orientation or arrangement of the back-washer arms which are in the form of plates so arranged such that one long edge is closed to the inner wall of the inner cylinder than the other long edge of the arm as shown clearly in FIGURES 2 and 4. Stated another way, one long trailer edge is closer to the central axis or shaft 54 than the other long leading edge of the arm. The shaft 54 revolves in the direction of the arrows shown in FIGURE 4 such that the arms 50 enable the liquid in the interior of the cylinder to be scooped up, so to state, by the wider-spaced long edge of the washer arm and forced against the inner wall of the inner cylinder at the location of the narrower-spaced long edge of the washer arm, thereby causing the water between the washer arm and the inner cylinder wall at the location of the arm to flow in an outward direction back through the filter screen 36 and thereby clean the exterior surface of the screen 36 from solid particles tending to cling to the filter screen. As each washer arm periodically returns to the same position in the filter during each rotation of the shaft 54, there is a kind of pulsating back-washing effect at this position caused by each arm. Since there are two such washer arms 50 symmetrically positioned and attached to the shaft 54, the cleansing of the filter screen 36 is repeated at each location on the filter screen twice per cycle of revolution of the shaft and the back-washing is continual and automatic during operation of the filter.

Although the washer plate arms 50 are shown to be arcuate in shape, obviously they may be flat or planar to scoop up the liquid as they rotate, and the number of washer arms increased to let us say three or four all supported by and symmetrically positioned around the revolving shaft 54. The arcuate or curved shape of the washer arms 50 is preferred because this shape offers less resistance to the flow of water thereover, and, hence, less power consumed in driving the shaft 54 and the arms 50, during operation of the filter.

The shaft 54 passes at both ends through packing glands 60 and anti-friction bearings 62 located outside of the outer housing 10. Brackets 64 mounted on end plates 14 and 16 serve as bearing supports.

In the operation of the self-cleaning filter of the invention, the incoming liquid or water under pressure in inlet pipe 28 passes through holes 35 in the distribution cylinder 30 and impinges on deflector plates 27. The deflected liquid impinges on the fine filter cloth or screen 36 which prevents dirt, debris and solid particles from entering the interior of the stationary inner cylinder. The rotating back-washer arms 50 in the interior of the inner cylinder force a back-wash of some of the filtered liquid in the interior of the inner cylinder back through the filter screen, thereby assuring a continual automatic self-cleaning of the filter screen from the inside out of the inner cylinder. Clogging of the very fine holes in the filter screen is prevented. The filtered liquid in the interior of the inner cylinder passes under pressure out through pipe 26. If the filtration screen 36 has a very close mesh and the speed of rotation of the washer arms is too high, then the incoming liquid will have difficulty passing through the filter screen and into the inner cylinder because the water in the inner cylinder will be forced out through the filter cloth faster than the water can enter the filter cloth. If the speed of rotation of the washer arms 50 is too slow, then the debris in the incoming water will clog the holes in the filter screen 36 because the washer arms will not wash the filter screen fast enough to keep the solid particles from collecting on the screen. The pressure of the incoming water must be adequate to insure that the incoming water passes through the fine holes in the filter screen. The speed of the shaft must be such as to insure a back flow or wash from the interior of the inner cylinder through the pores in the filter cloth of all debris.

Periodically, it may be desirable to clean the filter screen by fresh clean water without the necessity of interrupting the operation of the filter. This can be done by interrupting the flow of the liquid in inlet pipe 28 and then supplying the fresh clean water under pressure through nozzle 17 under control of a manually operable valve 9.

Gauge G indicates the pressure of the outgoing filtered liquid passing through the discharge pipe 26. A similar gauge may be suitably positioned to provide a reading of the pressure of the incoming liquid before it is filtered.

In one embodiment of the invention built and successfully tested, the length of the stationary outer cylinder 10 was approximately 11 inches and had an inner diameter of approximately 12 inches. The length of the inner stationary cylinder 12 was approximately 10½ inches, the holes 33 in the metal inner cylinder were 5/16" diameter on 3/8" centers. There were six holes 29 in the liquid distribution box 30. The backing wire screen 34 on the outside of the inner cylinder for supporting the filter screen had an 8 x 8 mesh p.s.i. The filter screen 36 was held tightly to the support backing wire screen 34 by eighteen parallel circular wires 38 spaced ½" apart. The spacing between the filter screen 36 on the inner cylinder and the interior of the outer cylindrical housing was about 1¾" but could be larger. The spacing between the long edge of each back washer arm nearest the inner periphery of the inner cylinder and the nearest point on the inner cylinder was ³⁄₁₆ or ¼" while the spacing between the other long edge of the back-washer arm and the nearest point on the periphery of the inner cylinder was about 1⅛". The deflector plate 27 consisted of an angle iron whose two sides made a 90 degree angle for preventing the solid particles in the incoming liquid from directly striking the filter screen.

With an 18 lb. input pressure of inlet liquid providing 38 gallons per minute, and using a 400 mesh (400×400=160,000 holes p.s.i.)

nylon cloth as a filter screen, the filtered water was delivered to discharge pipe 26 at about 36–38 g.p.m. The rotor speed for the shaft 54 was about 1435 r.p.m. The incoming liquid contained dissolved newspaper in water and the solid matter was filtered out to about 30–35 microns in the filtered water which appeared in discharge pipe 26. With substantially the same factors as above but with a 500 mesh of fabric cloth as a filter screen made from polypropylene (500×500=250,000 holes p.s.i.) and a rotor speed of 1155 r.p.m., the solid particles in the inlet water were filtered out to about 10 microns in the clean water discharge pipe 26, through the output rate of filtered water was considerably reduced from the 38 g.p.m. input rate of inlet water. The filtered water appeared very clean to the eye of the observer and good enough to drink.

The liquid filter of the invention is simple to construct, relatively inexpensive to manufacture, easy to disassemble, and highly effective to filter out solid particles of minute size from a liquid.

What is claimed is:

1. A liquid filter for removing solid particles from a liquid in a continuous process which simultaneously cleans the filter, comprising a stationary housing containing therein a stationary inner chamber spaced therefrom, said inner chamber having a filter screen on an outer surface, a rotatable shaft in the interior of and along an axis of said inner chamber, and a scooper washer arm fixedly mounted on said shaft in the interior of said chamber, rotatable in a direction parallel to said screen and with said chamber and positioned in proximity to but spaced from the interior wall of said inner chamber, said arm comprising a rigid plate extending along an appreciable portion of the length of said shaft, said arm being skewed such that one long edge thereof is nearer the screen than the other long edge, and solely a single inlet for introducing the liquid to be filtered through an opening in said housing.

2. A filter according to claim 1, wherein said outer housing and inner chamber are cylindrical in shape, and there are a plurality of skewed said washer arms symmetrically mounted on said shaft, each said washer arm being appreciably longer than its respective width.

3. A filter according to claim 1, wherein said inner chamber is a cylinder, and there are a plurality of said skewed washer arms in proximity to but spaced from said screen and symmetrically mounted on said shaft, each of said washer arms being appreciably longer than its width and being fixedly supported at spaced points from said shaft, said arms being rotatable on said shaft in a direction parallel to said screen.

4. A filter according to claim 2, said washer arms being appreciably longer than their respective widths, said inlet comprising an elongated liquid distribution arrangement extending over an appreciable portion of the effective length of said filter screen, and a pair of angularly disposed liquid deflecting plates positioned in the interior of said housing and in proximity to said liquid distribution arrangement and between it and the inner cylinder.

5. A filter according to claim 4, wherein said deflecting plates make an acute angle relative to each other, and an aperture in one end of said inner cylinder for enabling the discharge of the filtered liquid.

6. A filter according to claim 1, wherein said housing and inner chamber are cylindrical in shape, said inlet comprising an elongated arrangement mounted on the top of said housing and communicating with the interior of said housing, said arrangement extending over an appreciable portion of the effective length of the filter screen, a path for collecting the solid particles filtered from the incoming liquid located at the bottom of and communicating with the interior of said housing, there being a plurality of said washer arms symmetrically mounted on said shaft, each arm being appreciably longer than its width, said inner cylinder having an opening at one end for enabling the discharge of the filtered liquid.

7. A filter according to claim 2, wherein the washer arms are so arranged that the said one long edge of one arm is followed by the other long edge of the next arm, and means are provided for revolving the shaft in a direction such that the liquid in the inner chamber is caused to flow between the arms and the inner wall of the chamber, said liquid flowing over the width of each arm in a direction from said other long edge to said one long edge of each arm.

8. A filter according to claim 1, wherein said inner cylinder is a foraminous metal and said filter screen is a fabric material positioned over said foraminous metal cylinder, there being a backing support wire between said filter screen and foraminous metal cylinder, and a plurality of parallel arranged clamping wires over said filter screen for tightly holding said filter screen in position on said backing support wire and said inner cylinder.

9. A liquid filter for removing solid particles from a liquid in a continuous operation which simultaneously cleans the filter, comprising a stationary housing containing therein a stationary inner chamber spaced therefrom, said inner chamber having a filter screen on its outer surface, an elongated single inlet arrangement for introducing the incoming liquid under pressure into the interior of said outer housing through an elongated opening in said outer housing, a pair of deflector plates at an angle to each other positioned below said elongated inlet arrangement with the junction of said plates above the free ends of said deflector plates such that the incoming liquid is deflected by said plates in opposite directions so as to impinge upon the interior wall of said outer housing and particles in said incoming liquid are prevented from directly striking said filter screen, and means in the interior of said inner chamber for continually directing a back wash of liquid against said filter screen to effect a cleaning action thereof while said filter is in operation.

10. A filter according to claim 9, wherein said cleaning means comprises a revolvable shaft to which are symmetrically attached skewed washer arms each having a length substantially coextensive with the effective length of said filter screen.

11. A liquid filter for filtering particles from a liquid in a single operation while simultaneously cleaning the filter comprising a cylindrical screen, a rotatable shaft in the center of said screen, rods mounted at one end on said shaft, said rods each having at its other end an imperforate washer arm within and in proximity to but spaced from said screen and extending over substantially the entire effective length of such screen, each of said arms having an area extending over the entire length thereof closer to the screen than another area of the arm which extends over the entire effective length of said screen means producing relative motion between said screen and arms, and solely a single inlet for said liquid filter.

12. A liquid filter, according to claim 11, wherein said arms are: approximately arcuate in shape with one long trailer edge thereof closer to the screen than the other long leading edge, individually secured to a rod in turn mounted on said shaft positioned along the axis of said screen, and symmetrically arranged with respect to such shaft, the direction of said relative motion between screen and arms being from said other long edge toward said one long edge.

13. A liquid filter for removing solid particles from a liquid in a continuous process which simultaneously cleans the filter, comprising a stationary housing containing therein a stationary inner chamber spaced therefrom, said inner chamber having a filter screen on an outer surface, a rotatable shaft in the interior of and along an axis of said inner chamber, and a rod arm fixedly mounted at one end on said shaft in the interior of said chamber, and rotatable with said rod and shaft, said rod having a back washer scooper arm at its other end which moves in a direction parallel to said screen and is positioned in proximity to but spaced from said screen, said arm comprising a rigid plate extending along an appreciable portion of the length of said screen, said arm being arranged such that one long trailer edge thereof is nearer the screen than the other long leading edge, and solely a single inlet for introducing the liquid to be filtered through an opening in said housing.

14. A filter according to claim 13, wherein said inner chamber is a cylinder, and there are a plurality of said symmetrically mounted rods on said shaft, said rods respectively having similar washer arms in proximity to but spaced from said screen, each of each washer arms being appreciably longer than its width and being fixedly supported at spaced points from said shaft, said arms being rotatable by said shaft in a direction parallel to said screen.

References Cited

UNITED STATES PATENTS

| | | | |
|---|---|---|---|
| 520,293 | 5/1894 | Blackmore | 210—456 X |
| 1,946,500 | 2/1934 | Roberts | 210—489 X |
| 2,079,297 | 5/1937 | Manning | 55—491 X |
| 3,255,883 | 6/1966 | Nelson et al. | 210—415 X |
| 3,367,506 | 2/1968 | Rosaen | 210—411 X |

REUBEN FRIEDMAN, Primary Examiner

J. W. ADEE, Assistant Examiner

U.S. Cl. X.R.

210—415, 456